United States Patent Office 2,735,832
Patented Feb. 21, 1956

2,735,832

STABLE UNSATURATED ORGANIC-SULFUR DI-OXIDE RESINS CONTAINING AN ESTER OF TETRATHIOPHOSPHORIC AND TRITHIOPHOSPHOROUS ACID AND METHOD OF PREPARING THE SAME

John E. Wicklatz, Bartlesville, Okla., and John Francis Howe, San Diego, Calif., assignors to Phillips Petroleum Company, a corporation of Delaware No Drawing. Application March 7, 1952,
Serial No. 275,472

19 Claims. (Cl. 260—45.7)

This invention relates to the stabilization against decomposition during extrusion molding as well as at elevated temperatures of resins prepared from an unsaturated organic compound and sulfur dioxide by reaction of said compound and said sulfur dioxide under conditions which cause heteropolymerization. In one of its aspects the invention relates to the preparation of a stable resin, as described, by incorporation therein of a stabilizer compound. In another aspect the invention relates to the preparation of a stable resin by incorporation therein of a compound novel for this purpose. In still another aspect the invention relates to the provision of a stabilizer for resins, as described. In a further aspect this invention relates to the stabilization of a resin consisting essentially of the heteropolymer of an unsaturated organic compound and sulfur dioxide, and to the stable resin thus produced, by incorporating into the resin, during its preparation or thereafter, an ester of one of tetrathiophosphoric and trithiophosphorous acid.

Olefin-sulfur dioxide resins often cannot be employed satisfactorily for the production of molded articles because of their limited thermal stability. On being exposed to elevated temperatures, the original glass-like resin evolves sulfur dioxide, unsaturated organic compounds and various volatile decomposition products of unpleasant odor, expanding into a porous, voluminous mass having a puffy structure.

Various so-called stabilizing agents have been suggested as addition compounds for the olefin-sulfur dioxide resins. These addition compounds include organic solvent liquids and vapors, acrylic acid esters, vinyl acetate and acylating agents which supposedly act to remove occluded sulfur dioxide. When heated to the elevated temperatures necessary for injection molding operations, such as 300° F. or higher, these stabilizing agents become essentially ineffective and the resins containing them are substantially as unstable as in their absence. More recently it has been disclosed that sulfhydryl compounds such as mercapto ethanol, thioglycollic acid, benzyl mercaptan and the like impart thermal stability to said resins. However, these compounds are malodorous and are undesirable in commercial products. In addition those compounds are often not readily available.

We have now discovered that the incorporation of esters of tetrathiophosphoric acid and trithiophosphorous acid in unsaturated organic compound-sulfur dioxide heteropolymeric materials, i. e. so-called olefin-sulfur dioxide resins, provides a marked improvement in the thermal stability of the resins and renders them highly resistant to thermal decomposition. These stabilizing materials have the following structural formulas:

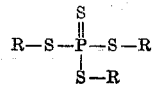

and

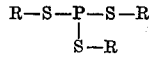

wherein R can be an alkyl group containing from 1 to 16 carbon atoms such as methyl, ethyl, tertiary butyl, secondary hexyl, normal octyl, tertiary octyl, tertiary dodecyl, secondary tridecyl, tertiary hexadecyl, or the like; and aryl or substituted aryl group containing from 6 to 16 carbon atoms such as phenyl, tolyl, ethylphenyl, tertiary butylphenyl, ditertiary butylphenyl, hexylphenyl, secondary octylphenyl, naphthyl, methylnaphthyl, tertiary butylnaphthyl, and the like; and a cycloalkyl or substituted cycloalkyl containing not more than 16 carbon atoms and preferably containing 5 or 6 carbon atoms in the cycloalkyl ring such as cyclopentyl, cyclohexyl, methylcyclopentyl, ethylcyclopentyl, dimethylcyclopentyl, tertiary butylcyclopentyl, methylcyclohexyl, isopropylcyclohexyl, secondary butylcyclohexyl, normal heptylcyclohexyl, ethylpropylcyclohexyl and the like. They are well-known chemical compounds and can be prepared by methods described in the literature.

The quantity of stabilizer employed is usually from 0.05 to 10, preferably 0.5 to 5 weight per cent, based on the weight of the dry resin.

The olefin-sulfur dioxide resins can be prepared by reacting sulfur dioxide with various unsaturated organic compounds, according to methods known in the art. Unsaturated organic compounds which can be employed are, for example, monoolefins and substituted monoolefins such as the normal butenes, pentenes, octenes, 4-cyclohexylbutene-1, and the like, cycloolefins such as cyclohexene, acetylenes, and polyfunctional unsaturated compounds such as allyl alcohol, vinyl acetate, allyl ethyl ether, ortho-allylanisole, ortho-allylphenol, para-bromoallylbenzene, methyl undecylenate, undecylenyl alcohol, undecylenic acid, acrylonitrile, etc. Mixtures of these olefins can also be employed to prepare the olefin-sulfur dioxide resins. The resins can be prepared by various methods, for example, by reacting sulfur dioxide with an olefin in the presence of an excess of the sulfur dioxide. The reaction can also be carried out in the presence of acetone or other solvent as a reaction medium. Another, and often preferred, method of preparing the resins is by the emulsion polymerization of the olefin and the SO₂ as described in copending application Serial No. 8,755, filed February 16, 1948, by Willie W. Crouch and Ernest W. Cotten, now Patent No. 2,645,631.

While the stabilizers can be incorporated in the resin in any suitable manner, it is important that they be thoroughly and intimately mixed with the resin to provide the maximum stabilizing effect. For example, the stabilizers can be thoroughly admixed with finely-divided, powdered resin. If desired, the stabilizers can be dissolved in a suitable solvent such as benzene, methylcyclohexane, paraffins such as heptane and higher boiling, and the like, and this solution admixed with the resin. When the resins are prepared by polymerization in aqueous emulsion, the stabilizers may be added directly to said emulsion prior to coagulation of the resins. Upon coagulation of this latex containing the stabilizer, a resin is obtained which contains said stabilizer in a very finely and uniformly dispersed form. In some instances it may be desirable to dissolve the stabilizer in a solvent such as benzene or other suitable solvent, prepare an aqueous emulsion of this solution using sodium lauryl sulfate or other suitable emulsifying agent, and add this emulsion to the latex prior to coagulation. When adding the stabilizer to the latex in any manner, it is highly desirable to maintain the mixture well agitated to insure satisfactory dispersion of the stabilizing agent. It should be understood that it is necessary to provide a thorough and uniform dispersion of the stabilizer throughout the resin, but that the method of incorporation is of less importance.

On olefin-sulfur dioxide resin was prepared employing in a stainless steel autoclave the following emulsion recipe:

| Ingredients: | Parts by weight |
|---|---|
| Commercial 1-butene [1] | 57.7 |
| Sulfur dioxide | 88.3 |
| Water | 180 |
| Ammonium nitrate | 0.5 |
| Maprofix MM [2] | 0.6 |

[1] The commercial 1-butene contained 63.2 mol per cent 1-butene with the remainder being other $C_3$ and $C_4$ hydrocarbons.
[2] Sodium lauryl sulfate dispersing agent commercially available in the form of a paste containing about 60 per cent solids.

The polymerization was conducted for a period of 7 hours at a temperature of 100° F. A conversion of 95 per cent was reached. At the end of the reaction period the reactor was opened and excess sulfur dioxide was vented. The latex was coagulated with methyl alcohol; the resin was then separated by filtration and dried in air at 130–150° F. for 16 hours.

The resin prepared as above was tested for thermal stability in the following manner: Weighed portions of stabilized and unstabilized resin were placed in suitable test tubes, which were then partially immersed in a constant temperature bath, held at 325±2° F., for varying periods of time. The stabilized samples were prepared by dissolving the stabilizer in benzene and adding this solution to the dry resin. The thermal decomposition is measured by the per cent loss in weight of the resin determined at the end of the heating periods. Results are tabulated below:

| | Percent Loss of Weight After Heating at 325± 2° F. | | |
|---|---|---|---|
| | 0.5 hrs. | 1 hr. | 3 hrs. |
| Control (no stabilizer added) | 7.6 | 13.5 | 25.2 |
| 2% $(C_4H_9S)_3P=S$, based on weight of dry resin | 1.2 | 1.8 | 3.2 |
| 2% $(C_4H_9S)_3P$, based on weight of dry resin | 1.9 | 3.1 | 6.8 |

The tertiary butyl ester of tetrathiophosphoric acid $[(C_4H_9S)_3P=S]$ was prepared by reacting tertiary butyl mercaptan and phosphorous pentasulfide in benzene and heating until no further evolution of hydrogen sulfide occurred. The tertiary butyl ester of trithiophosphorous acid $[(C_4H_9S)_3P]$ was prepared by reacting tertiary butyl mercaptan with phosphorous trichloride according to the method described in copending application Serial No. 67,747, filed December 28, 1948, by Willie W. Crouch and Robert T. Werkman, now Patent No. 2,682,554. U. S. 2,063,629 relates to the preparation of the esters disclosed in this invention.

Variation and modification are possible within the scope of the foregoing disclosure and appended claims to the invention the essence of which is that certain esters of tetrathiophosphoric acid and of trithiophosphorous acid have been incorporated into so-called olefin-sulfur dioxide resins and have been found to impart thermal stability to the composition thus produced.

We claim:

1. A thermally stable composition comprising a heteropolymeric resin of an unsaturated organic compound and sulfur dioxide containing an ester of tetrathiophosphoric acid in an amount effective to impart stability to the composition thus produced.

2. A production according to claim 19 in which the stabilizer is a tertiary butyl ester of tetrathiophosphoric acid.

3. A production according to claim 19 wherein the stabilizer is added to the dry resin.

4. A production according to claim 19 wherein the stabilizer is added to a latex containing said resin.

5. A production according to claim 19 wherein the stabilizer is added to the mass obtained upon coagulation of the latex and before separation of the resin contained therein.

6. A production according to claim 19 wherein the resin is one produced from 1-butene and sulfur dioxide by emulsion polymerization.

7. A production according to claim 6 wherein the stabilizer is a tertiary butyl ester of tetrathiophosphoric acid.

8. A thermally stable composition comprising a heteropolymeric resin of an unsaturated organic compound containing aliphatic unsaturation and which will polymerize with sulfur dioxide to form said resin and sulfur dioxide containing as a stabilizer an ester of an acid selected from the group consisting of tetrathiophosphoric acid and trithiophosphorous acid represented by the formula

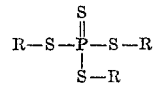

and

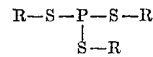

wherein R is a member selected from the group consisting of an alkyl group, containing from 1 to 16 carbon atoms; an aryl group, containing 6 to 16 carbon atoms; a substituted aryl group, containing 6 to 16 carbon atoms; a cycloalkyl group, containing not more than 16 carbon atoms; and a substituted cycloalkyl group containing not more than 16 carbon atoms in an amount effective to impart stability to the composition thus produced.

9. A thermally stable resin composition comprising a 1-butene sulfur dioxide resin and as a stabilizer an ester of an acid selected from the group consisting tetrathiophosphoric acid and trithiophosphorous acid represented by the formula

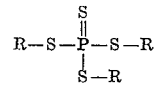

and

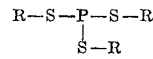

wherein R is a member selected from the group consisting of an alkyl group, containing from 1 to 16 carbon atoms; an aryl group, containing 6 to 16 carbon atoms; a substituted aryl group, containing 6 to 16 carbon atoms; a cycloalkyl group, containing not more than 16 carbon atoms; and a substituted cycloalkyl group containing not more than 16 carbon atoms in an amount effective to impart stability to the composition thus produced.

10. A thermally stable resin composition comprising a 1-butene sulfur dioxide resin and as a stabilizer therefor a tertiary butyl ester of tetrathiophosphoric acid in an amount sufficient to impart thermal stability to the composition.

11. A thermally stable composition according to claim 1 wherein 0.05–10 per cent by weight, based on the weight of the dry resin, of the said ester is present in the composition.

12. A thermally stable composition comprising a heteropolymeric resin of an unsaturated organic compound and sulfur dioxide containing an ester of trithiophosphorous acid in an amount effective to impart stability to the composition thus produced.

13. A production according to claim 19 in which the stabilizer is a tertiary butyl ester of trithiophosphorous acid.

14. A production according to claim 6 wherein the stabilizer is a tertiary butyl ester of trithiophosphorous acid.

15. A thermally stable resin composition comprising a 1-butene sulfur dioxide resin and as a stabilizer therefor a tertiary butyl ester of trithiophosphorous acid in an amount sufficient to impart thermal stability to the composition.

16. A thermally stable resin composition comprising a monoolefinic hydrocarbon-sulfur dioxide resin containing as a stabilizer an ester of an acid selected from the group consisting of tetrathiophosphoric acid and trithiophosphorous acid represented by the formula

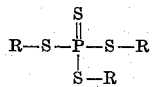

and

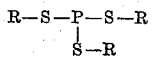

wherein R is a member selected from the group consisting of an alkyl group, containing from 1 to 16 carbon atoms; an aryl group, containing 6 to 16 carbon atoms; a substituted aryl group, containing 6 to 16 carbon atoms; a cycloalkyl group, containing not more than 16 carbon atoms; and a substituted cycloalkyl group containing not more than 16 carbon atoms in an amount effective to impart stability to the composition thus produced.

17. A method for the molding of a polysulfone resin, produced by polymerizing together an unsaturated organic compound containing aliphatic unsaturation and sulfur dioxide, without substantial decomposition thereof due to heat imparted thereto during said molding, which comprises intimately admixing with said resin prior to said molding step an ester of tetrathiophosphoric acid in an amount effective to impart stability against heat to the composition thus produced, and then heat molding said resin.

18. A method for the molding of a polysulfone resin, produced by polymerizing together an unsaturated organic compound containing aliphatic unsaturation and sulfur dioxide, without substantial decomposition thereof due to heat imparted thereto during said molding, which comprises intimately admixing with said resin prior to said molding step an ester of trithiophosphorous acid in an amount effective to impart stability against heat to the composition thus produced, and then heat molding said resin.

19. A method for the molding of a polysulfone resin, produced by polymerizing together an unsaturated organic compound containing aliphatic unsaturation and sulfur dioxide, without substantial decomposition thereof due to heat imparted thereto during said molding, which comprises intimately admixing with the said resin prior to said molding step an ester of an acid selected from the group consisting of tetrathiophosphoric acid and trithiophosphorous acid represented by the formulas

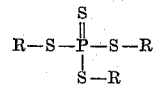

and

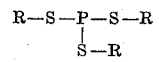

wherein R is a member selected from the group consisting of an alkyl group, containing from 1 to 16 carbon atoms; an aryl group, containing 6 to 16 carbon atoms; a substituted aryl group, containing 6 to 16 carbon atoms; a cycloalkyl group, containing not more than 16 carbon atoms; and a substituted cycloalkyl group containing not more than 16 carbon atoms in an amount effective to impart stability to the composition thus produced, and then heat molding said resin.

No references cited.